Jan. 16, 1968 R. C. FORREST 3,363,381
MODULAR PANEL JOINING MEANS WITH EXPANDABLE LOCKING STRIPS
Filed Sept. 3, 1965
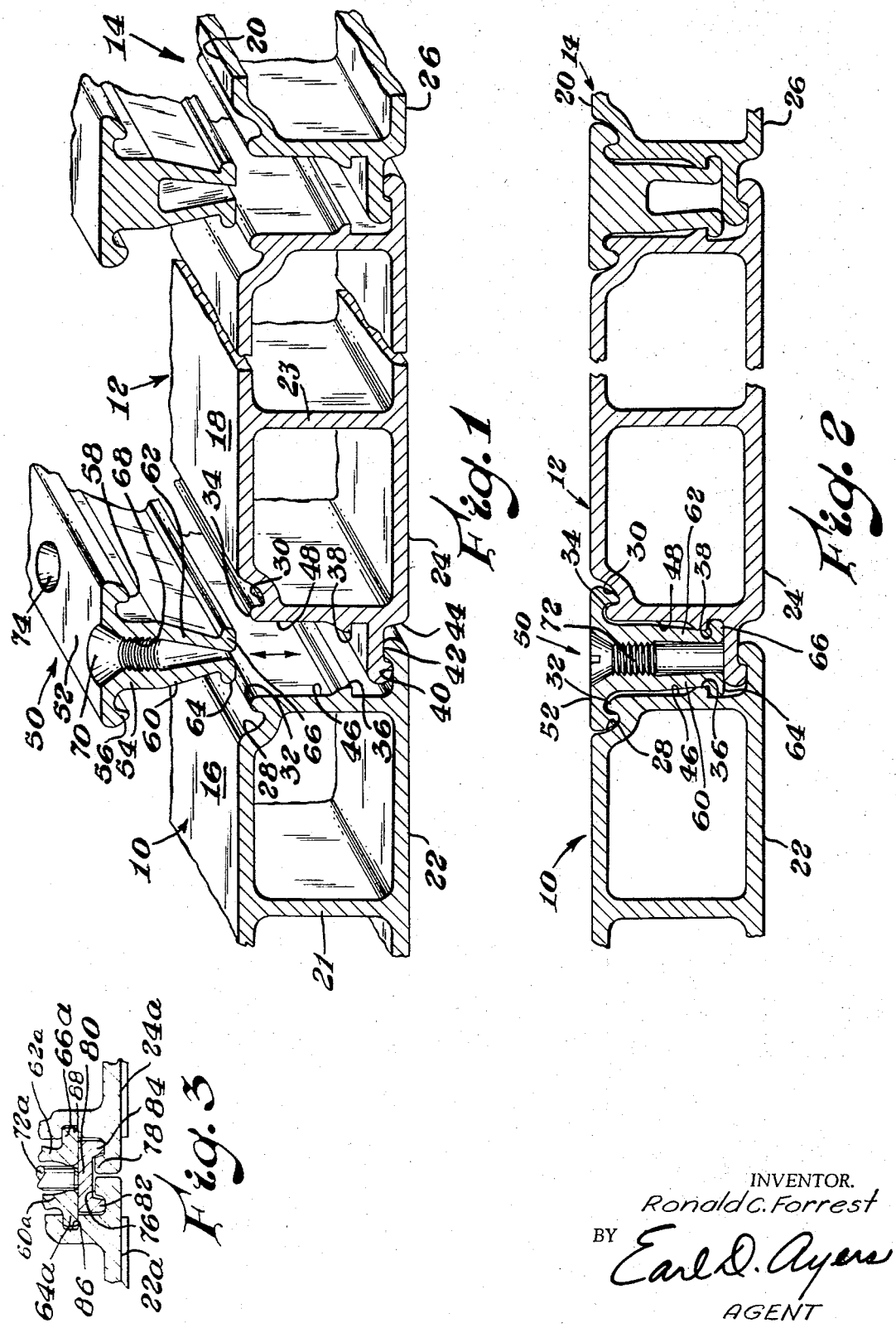
INVENTOR.
Ronald C. Forrest
BY Earl D. Ayers
AGENT __United States Patent Office__

3,363,381
Patented Jan. 16, 1968

3,363,381
MODULAR PANEL JOINING MEANS WITH EXPANDABLE LOCKING STRIPS
Ronald C. Forrest, Saginaw, Mich., assignor to The Dow Chemical Company, Midland, Mich., a corporation of Delaware
Filed Sept. 3, 1965, Ser. No. 484,817
7 Claims. (Cl. 52—464)

ABSTRACT OF THE DISCLOSURE

The invention relates to modular panel apparatus including means for joining adjacent panels together in edge-to-edge relationship. The panels have outwardly extending flanged parts at one edge and channels adjacent to the edge of each panel on an opposed surface. A locking strip having a T-shaped transverse cross-sectional configuration is used to secure the panels together. The transverse part of the T engages the channels and the expandable base part of the T is used to lock the flanged parts together.

---

This invention relates to modular panels, and particularly for means for joining together such panels.

Modular panels are widely used to form light-weight aircraft landing mats, cargo pallets, and walls, floors and bulkheads of buildings, vehicles and aircraft, for example.

It is desirable that the assembly and disassembly of such panel type structures be accomplished rapidly and with as little handling of the panels as possible. Such panel modules may be constructed in a number of ways, but usually have top and bottom surfaces, separated by structural members, or a core of materials such as honeycomb, expanded plastics or metals, wood, etc. In common, such panel modules usually have extruded metal edges which play an inetgral part in the locking arrangement.

While various means for locking together such panel modules have been made, including snap-locks and sliding dove-tail assemblies, such means have been less successful than is desirable. Such locking means are usually not well adapted to permit rapid assembly or disassembly of the panels, rely only on friction contact to maintain the locked joint in position, do not firmly lock the joint against all the applied loads, or require excessive translation or rotation of the modules in order to join the modules together.

Accordingly, a principal object of this invention is to provide an improved modular panel assembly which is adapted to be locked to similar assemblies.

Another object of this invention is to provide an improved panel locking assembly.

A further object of this invention is to provide an improved, rapid-to-use panel locking assembly.

Still another object of this invention is to provide an improved, simple to operate panel locking assembly.

Yet another object of this invention is to provide an improved panel locking assembly which rigidly holds panel structures in a fixed position when used.

In accordance with this invention modular panels are provided which have channels adjacent to opposite edges of a top (or bottom) surface, have an outwardly extending flanged strip extending away from the edge of the panel near the bottom (or top) of the panel, and have outwardly extending strips extending along the edge of the panels having a generally T-shaped transverse cross-sectional configuration between said channels and said flanged strips. A locking element strip extends between adjacent panel edges. The upper part has flanged parts which engage the channel adjacent to each edge of each panel and has a lower part means which expands by screw means to bear against said flanged strips and against the outwardly extending strips, thus locking the panels together.

The locking strip is inserted, fitting over the channels in the one surface of each panel and between the outwardly extending part and flanged strip of each panel. When screws are inserted, the hollow "base" part of the T-shaped cross-section of the locking strip expands, bearing against the above-mentioned parts to lock the joints together.

In one embodiment the flanged strips overlap, and in another embodiment an elongated locking element having a generally U-shaped transverse cross-sectional configuration fits over the flanges of the flanged strips below the locking strip.

Thus, in the second embodiment, the expanding of the locking strip causes the strip to bear against the flanged trips through the locking element.

The invention, as well as additional objects and advantages thereof, will best be understood when the following detailed description is read in connection with the accompanying drawings in which:

FIGURE 1 is a fragmentary isometric view, in section, of panel assemblies made in accordance with this invention;

FIGURE 2 is a side elevational view, in section of panels joined in accordance with this invention; and FIGURE 3 is a fragmentary sectional view of another joining assembly in accordance with this invention.

Referring to the drawing, there is shown, in part, three modular panels, indicated generally by the numerals 10, 12 and 14. The panels have top surface parts 16, 18, 20 and bottom surface parts 22, 24, 26, respectively. The spaced apart top and bottom surface parts are joined, for example, by webs 21, 23, and are parallel with each other. A depressed channel 28, 30, respectively, extends lengthwise of each of said panels along their top edges, leaving a boss or rib 32, 34 respectively extending lengthwise of the panel edge and somewhat below the top surface of the panels.

One side of each panel has an outwardly extending flanged part 40 or 42 extending lengthwise from or near the bottom edge of the panels 10, 12, 14.

The flange at the outer end of the part 40 extends upwardly while the flange at the outer end of the part 42 extends downwardly. The flanged part 42 is recessed, as at 44, from the bottom surface 24 by a distance at least equal to the thickness of the flanged part 40 whereby the flanged parts 40, 42 may overlap and engage each other with the bottom surface of each panel being substantially in the same plane.

An outwardly extending strip 36 or 38 extends along the facing edges of each pair of adjacent panels between the top and bottom surfaces of each panel and is parallel with said top and bottom surfaces. Usually the strips 36 and 38 are coplanar.

A locking strip, indicated generally by the numeral 50, is provided which is generally T-shaped in transverse cross-sectional configuration. The strip 50 has a generally flat upper surface 52 (except where penetrated by bores) and a web part composed of a solid upper part 54 and a split bottom part composed of bar-like strips 60, 62 which extend downwardly from the solid part 54 and which each have a flange, 64, 66 respectively, at their lower ends which extends outwardly from the web part.

The transverse part 52 of the locking strip extends substantially beyond the width of the body part 54 and has a downwardly extending lip or flange 56, 58 at the outer edge of each side.

The spacing between the flanges 56, 58 and the body part 54 and the configuration of the flanges 56, 58 is such that the flanges 56, 58 fit over the bosses or ribs 32, 34 and into the channels 28, 30.

The walls of the body part 54 fit snugly against the surfaces 46, 48 of the panel edges which lie between the outwardly projecting strips 36, 38 and the bosses or ribs 32, 34.

In operation, the panels 10, 12, 14 are disposed in side-by-side relationship with the flanged part 42 overlapping the flanged part 40. The locking element 50 is then inserted in the space between the panels with the flanges 64, 66 in the space between the flanged part 42 and the outwardly extending strips 36, 38.

A series of screws 72 are then inserted in the threaded bores 68 and tightened. The advancing lower end of the screws 72 force apart the wall strips 60, 62 forcing the tapered flanges 64, 66 into a close fit between the part 42 and the strips 36, 38. Thus, with the flanges 56, 58 engaging the channels 28, 30 and with the flanged members 40, 42 overlapping and thus coupled together and prevented from moving any substantial amount by the flanges 64, 66 the panels are firmly locked together and held against any substantial movement by the tight contact between the panels and the locking element 50.

FIG. 3 shows an alternative embodiment of the invention in which the overlapping flanged members 40, 42 are replaced by abutting flanged members 76, 78. A strip 80 having downwardly extending flanges 82, 84 on one face, is fitted over the flanged members 76, 78 so that the flanges of the members 76, 78 are held between the flanges 82, 84.

When the locking element is inserted in the assembly, the screw 72a force the strips 46a, 48a apart, thus forcing the flanged ends 64a 66a of the wall strips 46a, 48a between the strip 80 and the slots 86, 88 in the edge wall of the panels.

In the embodiment shown in FIG. 3, the panels need not have any overlapping edges, as in the situation with the embodiment shown in FIGS. 1 and 2.

This invention provides means for joining together panels in which the locking means is easily and simply inserted. The screws 72 provide an easy, positive means for actuating the locking means. Assembly and disassembly of the panels may be accomplished by relatively unskilled persons using a minimum of tools.

While panels made in accordance with this invention are commonly made of light metal such as aluminum or magnesium, for example, other light and heavier metals may be used, or panels made of non-metallic materials may be used.

While usually the strip-like locking means are made of the same material as are the panels, this is not necessary in practicing this invention.

What is claimed is:

1. Panel apparatus including a pair of panels having top, bottom and edge parts, each of said top parts having a walled channel adjacent to but spaced from said edge part and having a rib at said edge part, an outwardly extending flanged part disposed at least adjacent to said bottom of each panel, each of said edge parts having an outwardly extending strip disposed lengthwise of said panel between said outwardly extending flanged part and said top, said outwardly extending strips being aligned in predetermined relationship with respect to each other, and a locking assembly including an elongated element of generally T-shaped transverse cross-sectional configuration, said T-shaped element having a cross member part and a body part, said cross member part being generally perpendicular to said body part and having a downwardly extending flange on each side of said body part and adjacent to each end, said body part having parallel elongated downwardly extending spaced apart strips which each have an outwardly extending flange at their lower end, said last mentioned flanges facing generally away from said body part, said spaced apart strips converging towards one another at said flanged ends, and means for spreading said strips at said flanged ends, said locking assembly being in position between said panels and said strips being spread apart by said spreading means, said flanges on said strips engage said outwardly extending strips on said edge parts and hold said outwardly extending flanged parts in predetermined position with respect to one another while said downwardly extending flange parts on said cross member engage said channels.

2. Panel apparatus in accordance with claim 1, wherein said means for spreading includes a plurality of screws which extend through said cross member and between said strips.

3. Panel apparatus in accordance with claim 1, wherein said outwardly extending flanged parts overlap one another when said panels are in position to be locked together.

4. Panel apparatus in accordance with claim 1, wherein said outwardly extending flanged parts abut against one another with the flanges extending in the same direction, and said locking assembly includes a channel-like element which fits closely around said last mentioned flanges, said flanges of said strips bearing against said channel-like element.

5. Panel apparatus in accordance with claim 1, wherein said locking assembly is made of metal.

6. Panel apparatus in accordance with claim 1, wherein said ribs lie slightly below the top surface of said panels.

7. Panel apparatus in accordance with claim 1, wherein said panels are made of light metal alloy.

References Cited

UNITED STATES PATENTS

| | | | |
|---|---|---|---|
| 1,854,241 | 4/1932 | Adams | 52—584 X |
| 2,394,443 | 2/1946 | Guignon | 52—580 |
| 2,633,946 | 4/1953 | Huizenga | 52—620 |
| 2,962,133 | 11/1960 | Kivett et al. | 52—580 |
| 3,028,938 | 4/1962 | Schorr | 52—464 |

FRANK L. ABBOTT, *Primary Examiner.*

ALFRED C. PERHAM, *Examiner.*